US008542462B2

(12) United States Patent
Maruyama et al.

(10) Patent No.: US 8,542,462 B2
(45) Date of Patent: Sep. 24, 2013

(54) PERPENDICULAR MAGNETIC RECORDING HEAD HAVING A NON-MAGNETIC FILM RECESSED FROM THE AIR BEARING SURFACE FOR IMPROVED HIGH-DENSITY MAGNETIC RECORDING

(75) Inventors: Yohji Maruyama, Iruma (JP); Tadayuki Iwakura, Odawara (JP); Tetsuya Okai, Hadano (JP); Hiromi Shiina, Hitachi (JP); Kazue Kudo, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 447 days.

(21) Appl. No.: 12/827,999

(22) Filed: Jun. 30, 2010

(65) Prior Publication Data

US 2011/0002063 A1    Jan. 6, 2011

(30) Foreign Application Priority Data

Jul. 3, 2009    (JP) .................................. 2009-159172

(51) Int. Cl.
 *G11B 5/127* (2006.01)
(52) U.S. Cl.
 USPC ....................................................... 360/125.3
(58) Field of Classification Search
 USPC ........................................ 360/123.12, 123.37
 See application file for complete search history.

(56) References Cited

U.S. PATENT DOCUMENTS

| 4,656,546 | A | | 4/1987 | Mallory .......................... 360/110 |
| 4,740,855 | A | * | 4/1988 | Diepers et al. ............ 360/125.03 |
| RE33,949 | E | | 6/1992 | Mallary et al. ................. 360/110 |
| 7,295,401 | B2 | * | 11/2007 | Jayasekara et al. ....... 360/125.08 |
| 7,599,151 | B2 | * | 10/2009 | Hatatani et al. ............... 360/319 |

FOREIGN PATENT DOCUMENTS

JP    2007/265562    10/2007

* cited by examiner

*Primary Examiner* — David D Davis
(74) *Attorney, Agent, or Firm* — Zilka-Kotab, PC

(57) ABSTRACT

According to one embodiment, a perpendicular magnetic recording head includes a main magnetic pole having a trailing side and two lateral sides, a magnetic shield near the trailing side and both lateral sides of the main magnetic pole, the magnetic shield comprising: a first soft magnetic film with a relatively high saturation flux density positioned facing depthwise from a floating surface side thereof, a second soft magnetic film with a relatively low saturation flux density, and a first non-magnetic film. The head also includes a non-magnetic film interposed between the magnetic shield and the main magnetic pole, a first magnetic film magnetically coupled to the magnetic shield and the main magnetic pole on a side opposite a floating surface side thereof, and a coil surrounding a magnetic circuit, the magnetic circuit comprising the main magnetic pole and the first magnetic film. Other systems and methods are also described.

18 Claims, 12 Drawing Sheets

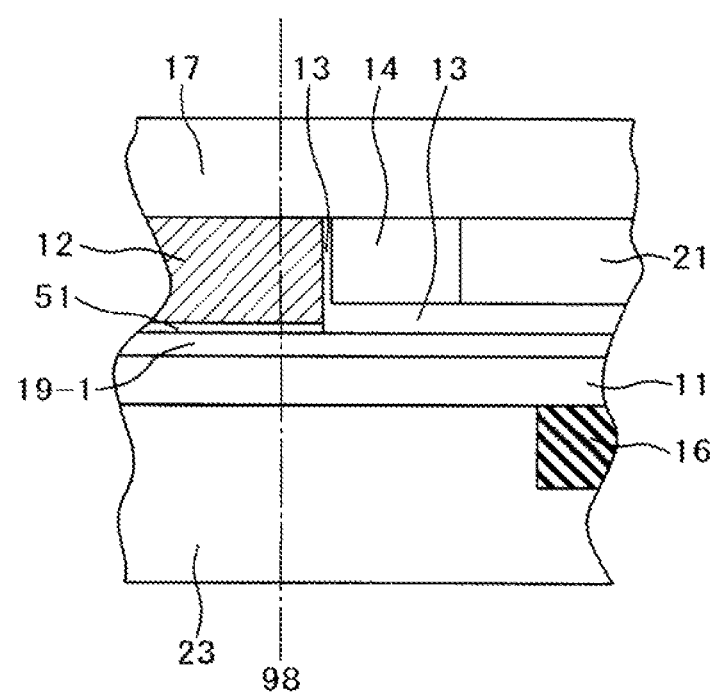

PERPENDICULAR MAGNETIC RECORDING HEAD HAVING A NON-MAGNETIC FILM RECESSED FROM THE AIR BEARING SURFACE FOR IMPROVED HIGH-DENSITY MAGNETIC RECORDING

RELATED APPLICATIONS

The present application claims priority to a Japanese Patent Application tiled Jul. 3, 2009, under Appl. No. 2009-159172, which is incorporated herein by reference.

FIELD OF THE INVENTION

The present invention relates to data storage systems, and more particularly, this invention relates to a perpendicular magnetic recording head suitable for recording high-density magnetic data on a medium plane.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

Storage (recording) devices in data equipment use semiconductor memory and magnetic memory for data storage. Semiconductor memory is used in internal storage devices due to their quick access time, and magnetic disk devices are used in external storage devices due to their large capacity and non-volatility. Storage capacity is a key indicator of the performance of a magnetic disk device, and with the growth of the information society in recent years, large capacity and compact magnetic disk devices are in increasing demand by the market. Perpendicular recording is possibly the most suitable recording system to meet this demand. In the perpendicular recording system, the direction of magnetization of the recording medium is perpendicular to the medium plane, so the effect of opposing magnetic fields acting between adjacent magnetized areas is small compared to a horizontal recording system. As a result, it is possible to record a high density of magnetic data on the medium, and to create a magnetic disk device with a very large capacity. It is possible that this system will completely replace conventional horizontal recording systems in the near future due to its capacity for high-density storage.

With a perpendicular recording system, it is preferable to increase the gradient of the recording magnetic field generated by the main magnetic pole to achieve a high density of recording. U.S. Pat. No. 4,656,546 discloses a perpendicular recording magnetic head with a magnetic shield having soft magnetic characteristics provided on the trailing side of the main magnetic pole as a means of increasing the gradient of the recording magnetic field. With this magnetic head, the distance between the main magnetic pole and the magnetic shield can be narrowed and material with a high saturation flux density used in the magnetic shield to further increase the recording magnetic field gradient. However, if the distance between the main magnetic pole and the high saturation flux density magnetic shield (the recording gap) is narrowed, much of the magnetic flux from the main magnetic pole flows into the magnetic shield, preventing a strong recording magnetic field from being achieved.

Japanese Unexamined Patent Publication No. 2007-265562 discloses a structure having a perpendicular magnetic recording head comprising a shield laminated in the float direction with a soft magnetic film of different Curie points, wherein a film with a high saturation flux density is positioned on the floating surface in a situation where it receives heat from the coil in a recording state, with the purpose of both suppressing pole erasure and ensuring a strong recording magnetic field.

The aim of the invention cited in Japanese Unexamined Patent Publication No. 2007-265562 is to suppress pole erasure by providing a function whereby the heating effect from the coil is used in the shield to reduce the saturation flux density of the soft magnetic film with a low Curie point and concentrate the flux contributing to the recording magnetic field selectively on the film with a high Curie point positioned on the floating surface, with flux being made to pass through the soft magnetic film with a low Curie point as the temperature drops after recording.

To achieve the above aim, heat is emitted from the coil. A magnetic head for perpendicular magnetic recording has a head structure which is significantly different as compared to an in-plane recording head, with the number of coil windings being 4 or less. For this reason, the resistance of the coil is less than $2\Omega$ within the element, and the temperature rise during recording is held within 10° C., as is known in the art. For this reason, the temperature rise that is useable during recording is within the range of 10° C., thereby rendering it difficult to realize a practical perpendicular magnetic recording head with a shield structure that uses this difference between Curie points.

The reason why the rise in temperature within the element is held to a low level by the restriction on the coil resistance is that the metal of which the element is comprised (having a high coefficient of linear expansion) expands with heat due to the temperature rise of the element, and the degree of float cannot be reduced (preventing an increase in recording density) due to the phenomenon of projection from the floating surface.

Since it is preferable to increase the gradient of the recording magnetic field generated by the main magnetic pole to achieve a high density of recording, and current approaches for maximizing the gradient of the recording magnetic field are limited by difficulties arising from magnetic flux flowing from the pole into the magnetic shield, preventing strong recording magnetic field formation, and element expansion due to heat, a system and/or method for overcoming the limitations of current methods for increasing the recording magnetic field gradient would be very beneficial.

SUMMARY OF THE INVENTION

According to one embodiment, a perpendicular magnetic recording head includes a main magnetic pole having a trailing side and two lateral sides, a magnetic shield near the trailing side and both lateral sides of the main magnetic pole, the magnetic shield comprising: a first soft magnetic film with a relatively high saturation flux density positioned facing depthwise from a floating surface side thereof, a second soft magnetic film with a relatively low saturation flux density, and a first non-magnetic film. The head also includes a non-magnetic film interposed between the magnetic shield and the main magnetic pole, a first magnetic film magnetically coupled to the magnetic shield and the main magnetic pole on a side opposite a floating surface side thereof, and a coil surrounding a magnetic circuit, the magnetic circuit comprising the main magnetic pole and the first magnetic film.

In another embodiment, a perpendicular magnetic recording head includes a main magnetic pole with a trailing side and two lateral sides, a side shield near the lateral sides of the main magnetic pole, a first non-magnetic film interposed between the side shield and the main magnetic pole, a trailing shield exposed on a floating surface side thereof near the trailing side of the main magnetic pole, the trailing shield being a first soft magnetic film with a relatively high saturation flux density, a second non-magnetic film interposed between the trailing shield and the main magnetic pole, a second soft magnetic film having a relatively low saturation flux density near a rear side of the trailing shield, a third non-magnetic film interposed between the trailing shield and the second soft magnetic film, a first magnetic film magnetically coupled to the trailing shield and the main magnetic pole on a side opposite a floating surface side thereof, and a coil surrounding a magnetic circuit, the magnetic circuit comprising the main magnetic pole and the first magnetic film.

In another embodiment, a perpendicular magnetic recording head includes a main magnetic pole with a trailing side and two lateral sides, a side shield positioned near both lateral sides of the main magnetic pole, and a trailing shield positioned near the trailing side of the main magnetic pole. A depthwise length of the side shield is about half a depthwise length of the trailing shield.

According to yet another embodiment, a perpendicular magnetic recording head includes a main magnetic pole having a trailing side and two lateral sides, a magnetic shield near the trailing side and both lateral sides of the main magnetic pole, a non-magnetic film interposed between the magnetic shield and the main magnetic pole, a first magnetic film magnetically coupled to the magnetic shield and the main magnetic pole on a side opposite a floating surface side thereof, and a coil surrounding the a magnetic circuit, the magnetic circuit comprising the main magnetic pole and the first magnetic film. The magnetic shield includes a first soft magnetic film having a relatively high saturation flux density exposed on a floating surface side thereof, a second soft magnetic film having a relatively low saturation flux density contacting the first non-magnetic film, and a first non-magnetic film formed on a rear wall of the first soft magnetic film and above a non-magnetic film.

In another embodiment, a perpendicular magnetic recording head includes a first non-magnetic film formed above a second non-magnetic film and a first soft magnetic film. A thickness of a first portion of the first non-magnetic film formed above the second non-magnetic film is greater than a thickness of a second portion of the first non-magnetic film formed above a rear end surface of the first soft magnetic film.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 7 is a cross-sectional view of parts of a perpendicular magnetic recording head according to one embodiment.

DETAILED DESCRIPTION

Figure 1A:
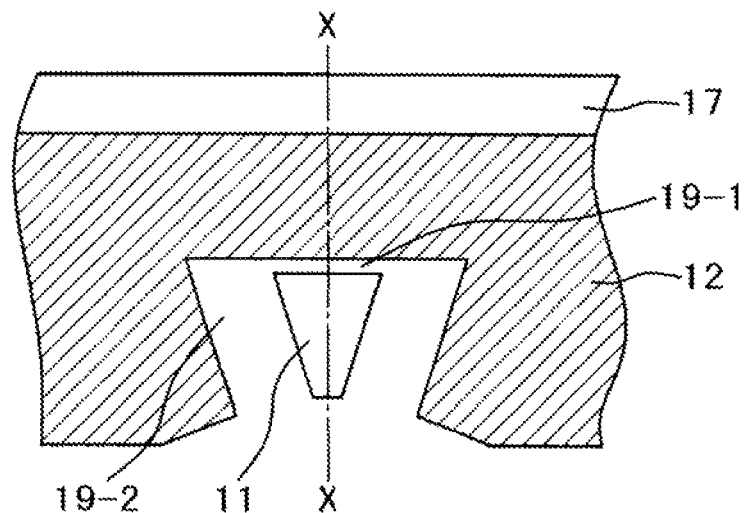
FIG. 1A is an enlarged diagram of parts of a perpendicular magnetic recording head according to one embodiment, as seen from the ABS.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

According to one general embodiment, a perpendicular magnetic recording head includes a main magnetic pole having a trailing side and two lateral sides, a magnetic shield near the trailing side and both lateral sides of the main magnetic pole, the magnetic shield comprising: a first soft magnetic film with a relatively high saturation flux density positioned facing depthwise from a floating surface side thereof, a second soft magnetic film with a relatively low saturation flux density, and a first non-magnetic film. The head also includes a non-magnetic film interposed between the magnetic shield and the main magnetic pole, a first magnetic film magnetically coupled to the magnetic shield and the main magnetic pole on a side opposite a floating surface side thereof, and a coil surrounding a magnetic circuit, the magnetic circuit comprising the main magnetic pole and the first magnetic film.

In another general embodiment, a perpendicular magnetic recording head includes a main magnetic pole with a trailing side and two lateral sides, a side shield near the lateral sides of the main magnetic pole, a first non-magnetic film interposed between the side shield and the main magnetic pole, a trailing shield exposed on a floating surface side thereof near the trailing side of the main magnetic pole, the trailing shield being a first soft magnetic film with a relatively high saturation flux density, a second non-magnetic film interposed between the trailing shield and the main magnetic pole, a second soft magnetic film having a relatively low saturation flux density near a rear side of the trailing shield, a third non-magnetic film interposed between the trailing shield and the second soft magnetic film, a first magnetic film magnetically coupled to the trailing shield and the main magnetic pole on a side opposite a floating surface side thereof, and a coil surrounding a magnetic circuit, the magnetic circuit comprising the main magnetic pole and the first magnetic film.

In another general embodiment, a perpendicular magnetic recording head includes a main magnetic pole with a trailing side and two lateral sides, a side shield positioned near both lateral sides of the main magnetic pole, and a trailing shield positioned near the trailing side of the main magnetic pole. A depthwise length of the side shield is about half a depthwise length of the trailing shield.

According to yet another general embodiment, a perpendicular magnetic recording head includes a main magnetic pole having a trailing side and two lateral sides, a magnetic shield near the trailing side and both lateral sides of the main magnetic pole, a non-magnetic film interposed between the magnetic shield and the main magnetic pole, a first magnetic film magnetically coupled to the magnetic shield and the main magnetic pole on a side opposite a floating surface side thereof, and a coil surrounding the a magnetic circuit, the magnetic circuit comprising the main magnetic pole and the first magnetic film. The magnetic shield includes a first soft magnetic film having a relatively high saturation flux density exposed on a floating surface side thereof, a second soft magnetic film having a relatively low saturation flux density contacting the first non-magnetic film, and a first non-magnetic film formed on a rear wall of the first soft magnetic film and above a non-magnetic film.

In another general embodiment, a perpendicular magnetic recording head includes a first non-magnetic film formed above a second non-magnetic film and a first soft magnetic film. A thickness of a first portion of the first non-magnetic film formed above the second non-magnetic film is greater than a thickness of a second portion of the first non-magnetic film formed above a rear end surface of the first soft magnetic film.

According to some approaches, to resolve the difficulties associated with current perpendicular magnetic recording heads, several embodiments are provided herein. In one embodiment, a perpendicular magnetic recording head includes a main magnetic pole, a magnetic shield provided on the trailing side and both sides of the main magnetic pole with a non-magnetic film interposed, a first magnetic film coupled magnetically to the magnetic shield and coupled magnetically to the main magnetic pole on the side opposite to the floating surface, and a coil which surrounds the magnetic circuit comprising the main magnetic pole and the first magnetic film, the magnetic shield being provided with a first soft magnetic film with a relatively high saturation flux density positioned facing depthwise from the floating surface side a first non-magnetic film, and a second soft magnetic film with a relatively low saturation flux density.

The trailing side of the main magnetic pole has a second non-magnetic film having an end in a position set back from the floating surface between the main magnetic pole and the non-magnetic film, the second soft magnetic film of the magnetic shield rising up over the second non-magnetic film.

In some approaches, the depthwise length of the first soft magnetic film may be set shorter than the depthwise length of the second soft magnetic film. Also, the depthwise length of the first non-magnetic film may preferably be in a range of between about 1 nm and about 100 nm.

In more approaches, the first non-magnetic film may be an oxide film of the first soft magnetic film. Also, the first non-magnetic film may be a non-magnetic metal. This non-magnetic metal, in some approaches, may be Cr or Ti. Furthermore, the first soft magnetic film may be an NiFeCo alloy, and the second soft magnetic layer may be an NiFe alloy, in some approaches.

Furthermore, there is a second magnetic film which magnetically couples the main magnetic pole and the first magnetic film.

In another embodiment, a perpendicular magnetic recording head includes a main magnetic pole, a side shield provided on both sides of the main magnetic pole with a non-magnetic film interposed, a trailing shield provided on the trailing side of the main magnetic pole with a non-magnetic film interposed, a first magnetic film connected magnetically to the trailing shield and connected magnetically to the main magnetic pole on the side opposite the floating surface, and a coil which surrounds the magnetic circuit comprising the main magnetic pole and the first magnetic film, the trailing shield being a soft magnetic film with a relatively high saturation flux density and provided exposed on the floating surface, a second soft magnetic film with a relatively low saturation flux density being positioned on the rear end surface of the trailing shield with a first non-magnetic film interposed.

It is preferable that a depthwise length of the side shield be around half a depthwise length of the trailing shield, in one approach. Additionally, a second non-magnetic film having its end in a position set back from the floating surface may be provided on the non-magnetic film of the trailing side of the main magnetic pole, the second soft magnetic film being positioned to rise over the second non-magnetic film.

In yet another embodiment, a perpendicular magnetic recording head includes a main magnetic pole, a magnetic shield provided on the trailing side and both sides of the main magnetic pole with a non-magnetic film interposed, a first magnetic film coupled magnetically to the main magnetic pole on the opposite side to the floating surface and coupled magnetically to the magnetic shield, and a coil which surrounds the magnetic circuit comprised of the main magnetic pole and first magnetic film, in which the magnetic shield has a first soft magnetic film with a relatively high saturation flux density exposed on the floating surface, a first non-magnetic film formed on the rear end wall of the first soft magnetic film and above the non-magnetic film, and a second soft magnetic film of a relatively low saturation flux density in contact with the first non-magnetic film.

In the first non-magnetic film, the thickness of the part formed above the non-magnetic film may be thicker than the part formed on the rear end surface of the first soft magnetic film, in some approaches.

According to these embodiments and approaches, the recording magnetic field from the main magnetic pole is strongly maintained, and it is possible to increase the magnetic field gradient. Therefore, it is possible to realize a high-density magnetic recording device.

Figure 3A:
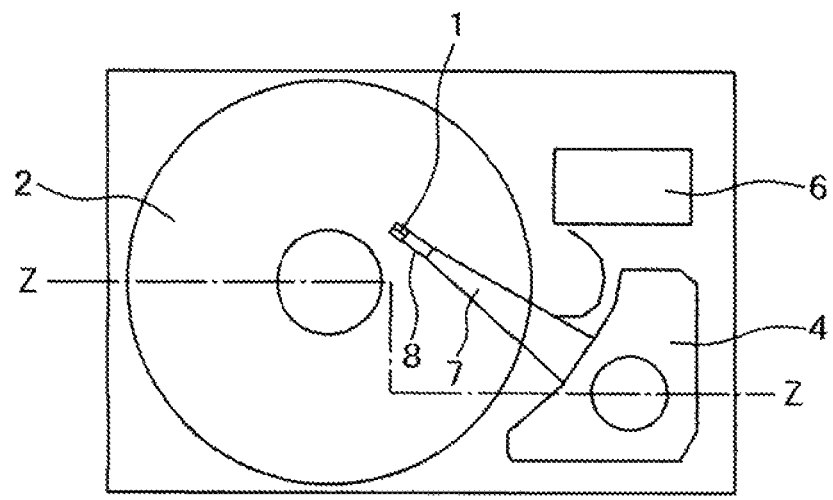
FIG. 3A is a schematic view of a magnetic disk device used in the perpendicular magnetic recording head, according to one embodiment.
Figure 3B:
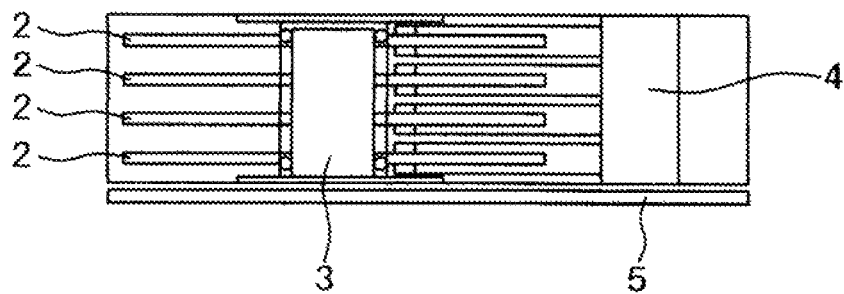
FIG. 3B is a cross-sectional view through the line Z-Z in FIG. 3A.

FIG. 3A shows the basic structure of a magnetic disk device which uses the perpendicular magnetic recording system, according to one embodiment. FIG. 3B is a cross-section through the line Z-Z in FIG. 3A. Recording medium 2 is connected directly to motor 3, which turns when data is input and output. Perpendicular magnetic recording head 1 is supported by suspension 8, suspension 8 being supported by rotary actuator 4 via arm 7. Suspension 8 has the function of supporting perpendicular magnetic recording head 1 above recording medium 2 with a prescribed force. Processing of playback signals or input and output of data is carried out by signal processing circuit 5 and recording playback circuit 6 attached to the main device. The playback waveform obtained using the perpendicular magnetic recording system (amplitude variation of playback signal on a time axis) is a trapezoid waveform which differs from the Lorentz waveform seen in the horizontal recording system, and so the signal processing circuit and the waveform equalization circuit are different to the in-plane magnetic recording system.

The perpendicular magnetic recording system employs a medium with the easy axis of the recording surface in the perpendicular direction. A glass or aluminum substrate is used in recording medium 2 of the magnetic disk device. A magnetic thin film comprising the recording layer is formed on a substrate. The recording magnetic field from the main magnetic pole of perpendicular magnetic recording head 1 acts on recording medium 2, and reverses the magnetization of the recording layer. As it is necessary to record using magnetic field components in the perpendicular direction with this perpendicular magnetic recording, a soft magnetic under layer (SUL: Soft Under Layer) is provided between the recording layer and the substrate.

To write magnetic data into a recording medium 2 of this type, a recording head able to apply an electromagnetic conversion effect is employed, according to one embodiment. Moreover, to playback the magnetic data, a playback head which uses magnetoresistance phenomena, giant magnetoresistance phenomena or electromagnetic induction phenomena is employed, according to several embodiments. These recording heads or playback heads are provided with input/output parts called sliders, forming perpendicular magnetic recording head 1. Perpendicular magnetic recording head 1 moves across the surface of recording medium 2 with the rotation of rotary actuator 4, and writes in or plays back magnetic data once the desired position has been reached. The electrical circuit which controls this exists together with signal processing circuit 5.

Figure 1B:
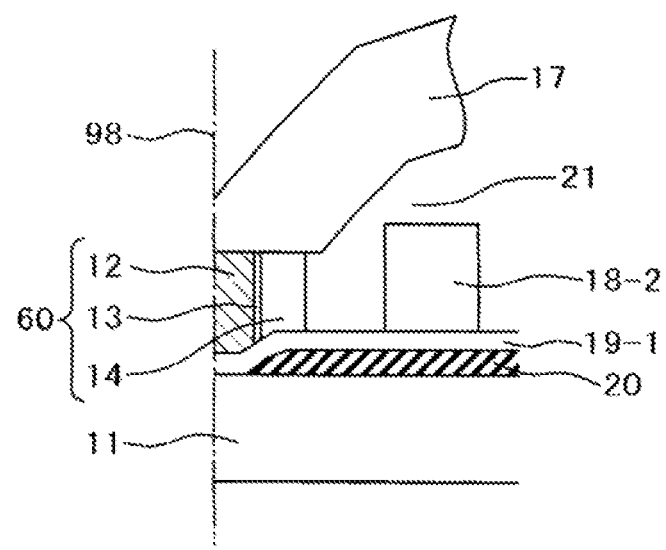
FIG. 1B is a cross-sectional view through the line X-X in FIG. 1A.

A description will now be given of the structure of a perpendicular magnetic recording head 1 according to one particular embodiment. FIG. 1A and FIG. 1B are enlarged diagrams showing the main parts of the structure of the recording head. FIG. 1A is a diagram of the view from the floating surface facing the recording medium, FIG. 1B is a cross-section through the line X-X in FIG. 1A, being a cross-section through the center of main magnetic pole 11. Main magnetic pole 11 extends to floating surface 100, and has a cross-section in the form of an inverted trapezium (both sides of the main magnetic pole being tapered). Non-magnetic film 19-1 is provided above this main magnetic pole 11 (trailing side), and non-magnetic film 19-2 is provided on both sides. Magnetic shield 60 is provided with these non-magnetic films interposed. The top of magnetic shield 60 is connected magnetically to auxiliary pole 17 comprising a first magnetic film. Soft magnetic films with differing saturation flux densities are provided in conjunction depthwise towards magnetic shield 60, with first soft magnetic field 12 with a high saturation flux density exposed on floating surface 98, and second soft magnetic film 14 with a relatively low saturation flux density provided in a position set back from the floating surface via non-magnetic film 13 constituting a first non-magnetic film. The width of the recording track is determined by the top of main magnetic pole 11 (trailing edge).

In a preferred embodiment, the depthwise length of first soft magnetic film 12 is about 50 nm, the length of the non-magnetic film 13 is about 1 nm, and the length of second soft magnetic film 14 is about 100 nm. Thus the total depthwise length of magnetic shield 60 is approximately 150 nm. The depthwise length of first soft magnetic film 12 is set shorter than the length of second soft magnetic film 14. The structure of the shield is designed to increase the gradient of the recording magnetic field, and has the effect of increasing the gradient of the recording magnetic field where the depthwise length of first soft magnetic field 12 is no more than 50% of the length of second soft magnetic field 14, but where greater than 50% comes close to being a single layer of first soft magnetic film with its high saturation magnetic flux density, with the result that the effect on increasing the gradient of the recording magnetic field is insufficient. It should be noted that non-magnetic film 13 is formed by sputtering. Where a conductive metal film is used in non-magnetic film 13, it can be easily seen that it can function as a coating sheet layer when forming second soft magnetic film 14. Moreover, once first soft magnetic film 12 has been formed, it is possible to form non-magnetic film 13 by oxidation.

FIG. 1B shows the situation where upper coil 18-2 which induces magnetic flux in main magnetic pole 11 is positioned with the interposition of non-magnetic film 19-1 and non-magnetic film 20 constituting a second non-magnetic film. In particular the end of non-magnetic film 20 is set back from floating surface 98, the rear end side of magnetic shield 60 being of a structure that rises up over non-magnetic film 20. Moreover, insulating film 21 is provided to ensure insulation between auxiliary magnetic pole 17 and upper coil 18-2.

Figure 4:
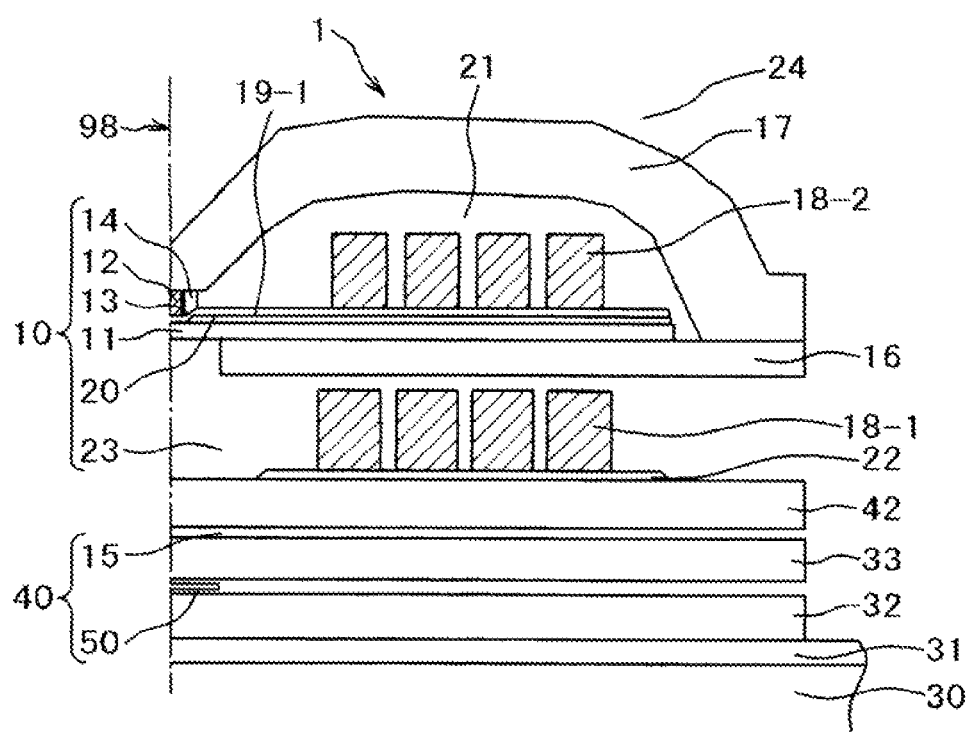
FIG. 4 is a cross-sectional view through a perpendicular magnetic recording head according to one embodiment.

FIG. 4 shows a cross-section through perpendicular magnetic recording head 1 including the main parts. Recording head 10 and playback head 40 are formed on slider substrate 30. Playback head 40 is basically comprised of lower shield 32, upper shield 33, and playback element 50 which detects magnetic data with an interposed insulating layer (under layer) 31 provided on substrate 30.

Recording head 10 is separated from playback head 40 by non-magnetic layer 15. As already shown in FIG. 1A and FIG. 1B, first soft magnetic film 12, first non-magnetic film 13 and second soft magnetic film 14 are present around the three sides of main magnetic pole 11 with non-magnetic film 19-1 and non-magnetic film 19-2 interposed. First soil magnetic film 12 and second soft magnetic film 14 are connected magnetically to auxiliary magnetic pole 17 forming a closed magnetic path. Auxiliary magnetic pole 17 is connected magnetically to magnetic film 16 constituting a second magnetic film at its rear, and furthermore magnetic film 16 and main magnetic pole 11 are connected magnetically. Upper coil 18-2 is positioned within the closed magnetic path formed from these elements. However, even without providing magnetic film 16, it is possible to magnetically connect the rear of main magnetic pole 11 and the rear of auxiliary magnetic pole 17, so magnetic film 16 can be omitted.

One particular embodiment has the purpose of effectively introducing magnetic flux into main magnetic pole 11, lower auxiliary magnetic pole 42 is provided in parallel with auxiliary magnetic pole 17. Lower coil 18-1 is provided between lower auxiliary magnetic pole 42 and magnetic film 16 and connected to both ends of upper coil 18-2, and wound in a spiral around main magnetic pole 11 and magnetic film 16 (the invention can be applied without any problems to a helical winding coil structure, and in this case the upper and lower layer coils are connected in a helical shape). Insulating films 22, 23 of alumina are provided with the purpose of ensuring electrical insulation between lower coil 18-1, lower auxiliary magnetic pole 42 and magnetic film 16. It should be noted that an alumina film is used for non-magnetic film 19-1, and a non-magnetic metal film or a polymer resin film is used for non-magnetic film 20. For their protection, all the above elements are covered with an alumina film approximately 25 μm in thickness as protective layer 24 that is non-magnetic and insulating.

A flux is generated in magnetic film 16 and main magnetic pole 11 by causing a current to flow in lower coil 18-1 and upper coil 18-2. In addition to flowing into the recording medium this magnetic flux is led to first soft magnetic film 12 and second soft magnetic film 14. The flux passing through the recording medium returns to auxiliary magnetic pole 17 and lower auxiliary magnetic pole 42. Lower auxiliary magnetic pole 42 has the function of reducing the influence of the recording magnetic field on playback element 50.

Non-magnetic film 20 which forms the magnetic gap between first soft magnetic film 12 and main magnetic pole 11 is a device which determines the amount of a portion of the magnetic flux generated by main magnetic pole 11 which will return to auxiliary magnetic pole 17. In other words, the flux is mainly made to pass through first soft magnetic film 12 because second soft magnetic film 14 with its low relatively low saturation flux density has a structure which is raised up over non-magnetic film 20, increasing the gradient of the recording magnetic field. In other words, the structure of this one particular embodiment 1 has the function of concentrating magnetic flux on the floating surface constantly even without applying coil-generated heat and the limitation on Curie point as explained regarding the magnetic film used in Japanese Unexamined Patent Publication 2007-265562.

Within one particular embodiment, NiFeCo alloy with a saturation flux density of 2.4 T was used as main magnetic pole 11. The film thickness was roughly 160 nm. NiFeCo alloy with a saturation flux density of 2.28 T, a thickness of 400 nm and a depth of about 50 nm was used in first soft magnetic film 12. NiFe alloy with a saturation magnetic flux density of 1.68 T a thickness of approximately 350 nm and a depth of approximately 100 nm was used as second soft magnetic film 14. Cr alloy, Ti Alloy, or an oxide film was used with a thickness of approximately 400 nm and a depth of 1 nm for first non-magnetic film 13. NiFe alloy with a film thickness of approximately 1.2 μm was used as auxiliary magnetic pole 17. NiFe alloy with a film thickness of 1.0 μm was used for magnetic film 16. Copper with a film thickness of 2 μm was used in coils 18-1, 18-2. NiFe alloy with a film thickness of 1.2 μm was used for lower auxiliary magnetic pole 42.

Figure 5:
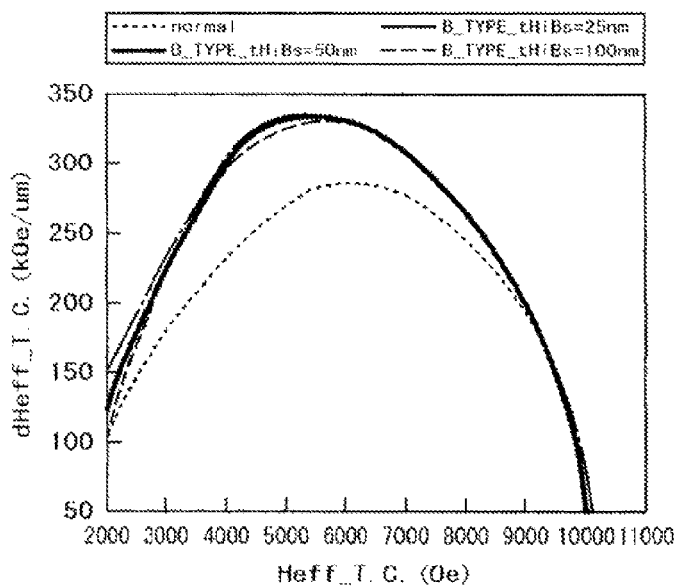
FIG. 5 is a diagram illustrating the results of calculation for magnetic field strength and magnetic field gradient in a perpendicular magnetic recording head according to one embodiment.

The reason why a strong magnetic field and a high magnetic field gradient can be achieved will now be explained for the above one particular embodiment with reference to FIG. 5. FIG. 5 shows the calculated results where this second soft magnetic film 14 with a relatively low saturation magnetic flux density is positioned inward of first soft magnetic film 12 with a relatively high saturation magnetic flux density with an interposing first non-magnetic film 13 having a thickness of about 1 nm. For comparison, it also shows the calculated results with magnetic shield 60 composed of soft magnetic film (1.68 T) with a relatively low saturation flux density as "normal". The calculation assumes a saturation flux density of 2.4 T for the first soft magnetic film 12 with a relatively high saturation flux density, and shows three variations with a depthwise length of 25 nm, 50 nm, 100 nm. Moreover, assuming 1.68 T for second soft magnetic film 14 with a relatively low saturation flux density, it assumes a depthwise length of about 1 nm for first non-magnetic film 13. The total depthwise length of these was fixed at approximately 150 nm. This adjustment was carried out by adjusting the inward length of second soft magnetic layer 14 with a relatively low saturation flux density. Moreover, the film thickness of non-magnetic film 19-1 which constitutes the recording gap was fixed at 25 nm, the film thickness of non-magnetic film 20 on which second soft magnetic film 14 rises up was 50 nm, and the end position 50 nm from the floating surface.

The Heff_T.C. on the X-axis in FIG. 5 shows the value of the effective magnetic field at the center of the track width of the recording head, with the dHeff_T.C. on the Y-axis showing the value for the magnetic field gradient of the head. The lower part of FIG. 5 shows the maximum value for the effective magnetic field of the recording head Heffmax and the maximum value for the magnetic gradient dHeffmaxTrack-Center. The dtHiBs-WAS in the same table is the depthwise length of first soft magnetic film 12 with its relatively high saturation flux density, Thickness Mainpole being the film thickness of main magnetic pole 11, BevelAngle the angle of slope provided on both sides of the main axis, TrailingGap the film thickness of non-magnetic layer 19-1, Tww the width (width of the upper part of the trapezoid) of main magnetic pole 11, tWAS the film thickness of magnetic shield 60, Height_RP the film thickness of auxiliary magnetic pole 17 at the floating surface, SideGap the distance (19-2) between main magnetic pole 11 and first soft magnetic film 12, Hymax the value of the perpendicular direction component in the magnetic field of the head. These results show that in all cases where a first soft magnetic film 12 with high saturation flux density was inserted, the magnetic gradient was high compared to the case where a soft magnetic film only with a relatively low saturation flux density was used shown by the broken line, despite the fact that the maximum value Heffmax of the effective magnetic field was approximately the same strength. This shows that in addition to obtaining a high recording magnetic field by having the magnetic shield 60 composed mainly of soft magnetic film with a relatively low saturation flux density, it is possible to obtain a high magnetic field gradient by having a high saturation flux density film on the floating surface side.

Moreover, when employing the structure of this embodiment, it is clear that the variation in the dHeffmaxTrack-Center of the magnetic field gradient with respect to changes in the dtHiBs-WAS was low. This could be due to the fact that the improvement in magnetic field gradient obtained in this one particular embodiment is strongly dependent on the length of first soft magnetic film 12 with high depthwise saturation flux density. As a result, as accuracy is not required in the depthwise length of first soft magnetic film 12, the rear end of first magnetic soft film 12 can be formed to rise up over the front end sloping surface of non-magnetic film 20. In other words it is possible to have a margin in the depthwise length of first soft magnetic film 12. This tendency is excellent from the point of view of reliable quality and yield when manufacturing magnetic heads. This result can be seen as the effect of the one particular embodiment in having first soft magnetic film 12 with its high saturation flux density positioned on the floating surface, and moreover the second soft magnetic film 14 with its relatively low saturation flux density positioned in a set-back position with an interposing non-magnetic film. Incidentally, where the entire magnetic shield is comprised of a single film of high saturation flux density, the maximum magnetic field is approximately 9 KOe, which does not allow for a satisfactory recording performance. Moreover, where first soft magnetic film 12 and second soft magnetic film 14 are formed continuously (without an intervening non-magnetic film 13), the magnetic field generated in actual elements is inconsistent, and element yield is reduced. The cause of this is thought to be the influence of exchange-coupled magnetic fields between first soft magnetic film 12 and second soft magnetic film 14, or the influence of anisotropic magnetic fields involving the growth of crystals. It is presumed that the intervention of non-magnetic film 13 reduces these effects (the reduction in effect on exchange-coupled fields due to a non-magnetic layer of 1 nm is well-known, especially in recording media). In other words, it is thought that non-magnetic film 13 allows the flux passing through first soft magnetic film 12 and second magnetic soft film 14 to flow independently, and not interfere (or greatly reduce interference).

With the structure of the embodiment described above, the fact that the main body of the magnetic shield is comprised of a soft magnetic film with a relatively low saturation flux density reduces the leakage of magnetic field from the adjacent main magnetic pole, which results in a high recording magnetic field and also produces a higher magnetic field gradient by having a high saturation flux density film on the floating surface side, according to one embodiment. Moreover, having second soft magnetic film 14 with its relatively low saturation flux density rise up on non-magnetic film 20 further increases the magnetic field gradient.

Furthermore, the problem of pole erasure cited in Japanese Unexamined Patent Publication No. 2007-265562 is overcome by having an appropriate magnetic distance between main magnetic pole 11 and second soft magnetic film 14 by adjusting the film thickness of both non-magnetic film 20 and non-magnetic film 19-1 (in particular the thickness of non-magnetic film 20 is kept in the range of about 20 nm to about 100 nm) and the magnetic charge remaining in main magnetic pole 11 without reducing the magnetic field strength acting on second soft magnetic film 14.

The process of manufacturing a recording head element using one of the above described embodiments is now be described using FIGS. 6A-6L, according to one embodiment.

Figure 6A:
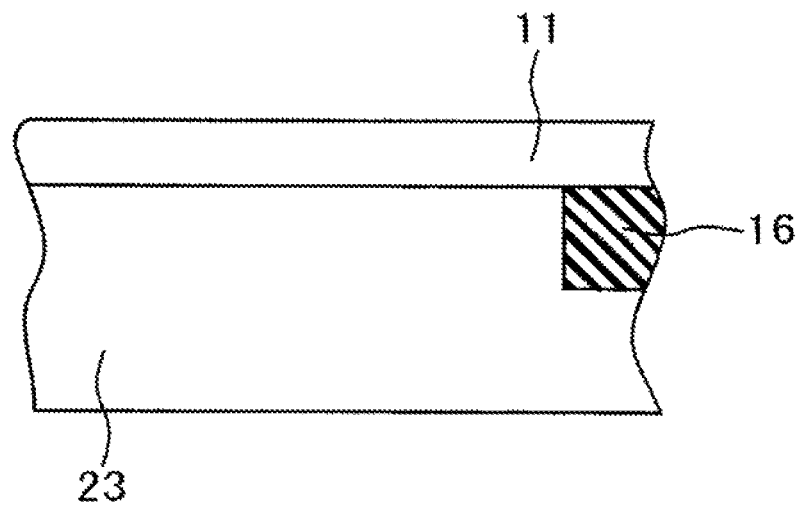
FIG. 6A is a diagram illustrating the process of creating a perpendicular magnetic recording head according to one embodiment.
Figure 6B:
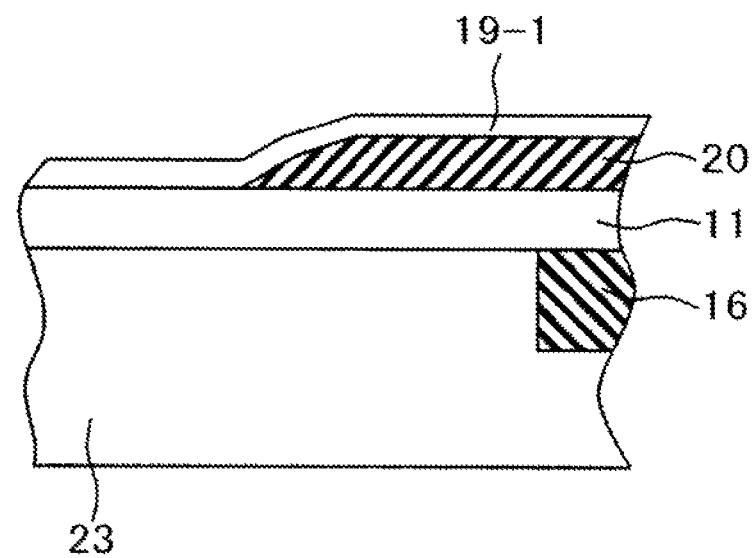
FIG. 6B is a diagram illustrating the process of creating the perpendicular magnetic recording head according to one embodiment.
Figure 6C:
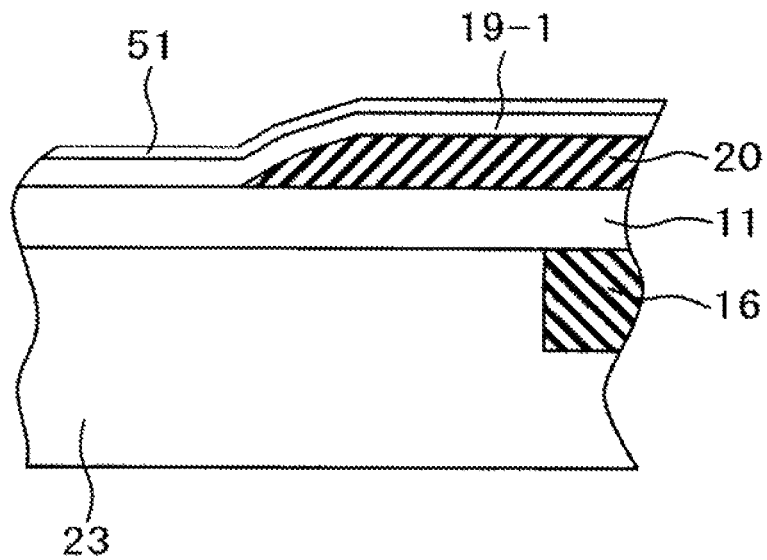
FIG. 6C is a diagram illustrating the process of creating the perpendicular magnetic recording head according to one embodiment.
Figure 6D:
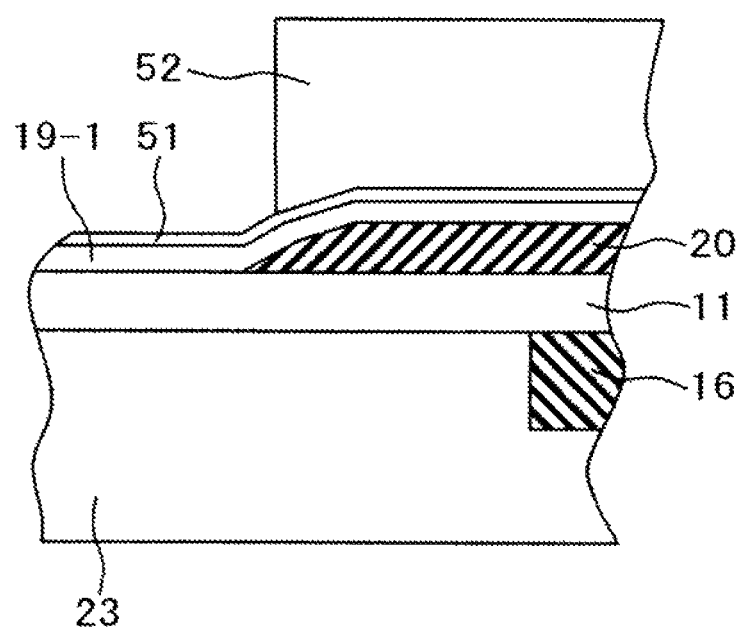
FIG. 6D is a diagram illustrating the process of creating the perpendicular magnetic recording head according to one embodiment.
Figure 6E:
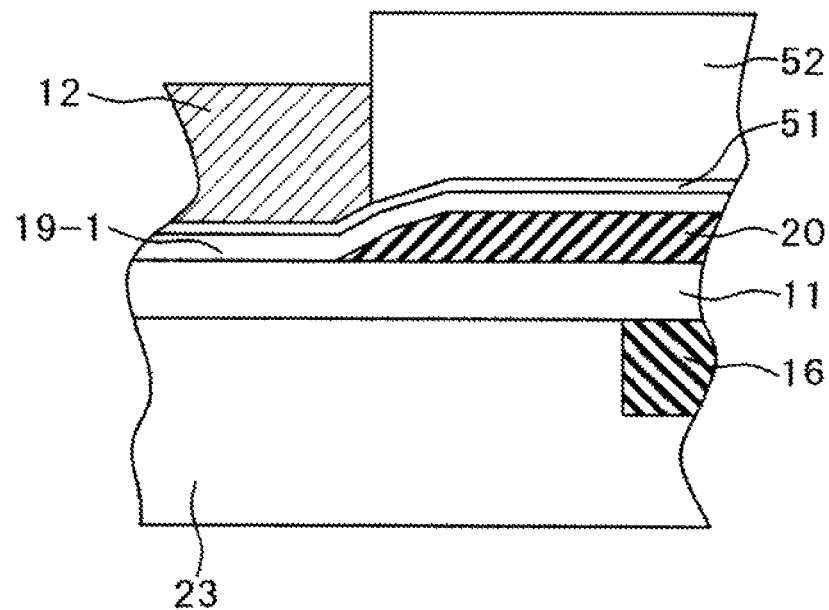
FIG. 6E is a diagram illustrating the process of creating the perpendicular magnetic recording head according to one embodiment.
Figure 6F:
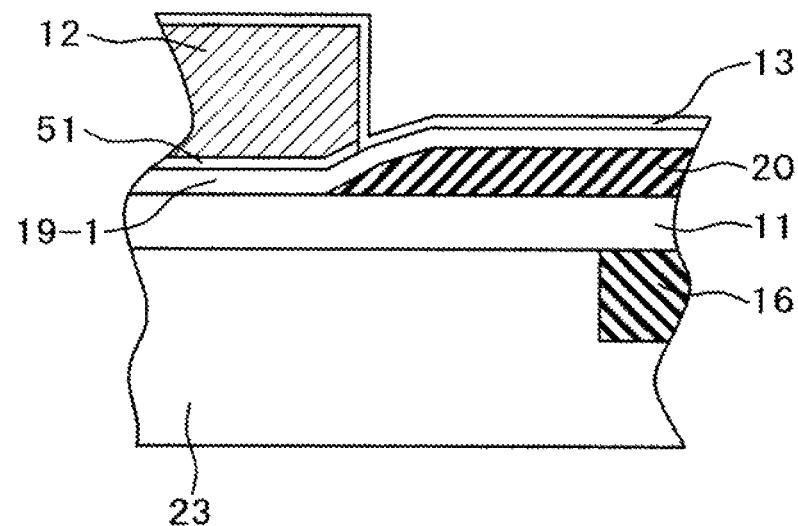
FIG. 6F is a diagram illustrating the process of creating the perpendicular magnetic recording head according to one embodiment.
Figure 6G:
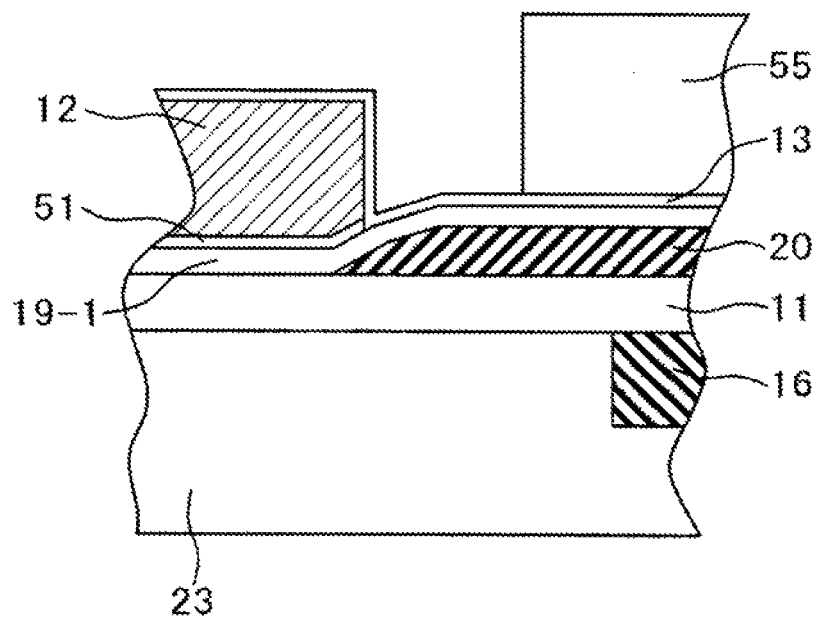
FIG. 6G is a diagram illustrating the process of creating the perpendicular magnetic recording head according to one embodiment.
Figure 6H:
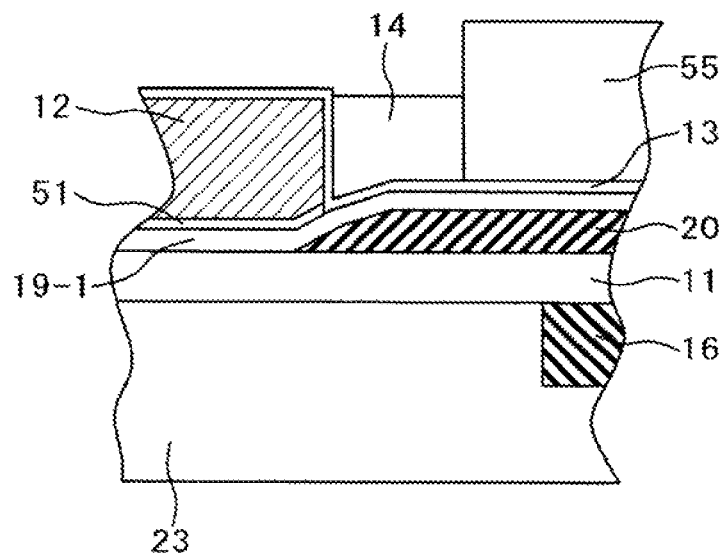
FIG. 6H is a diagram illustrating the process of creating the perpendicular magnetic recording head according to one embodiment.
Figure 6I:
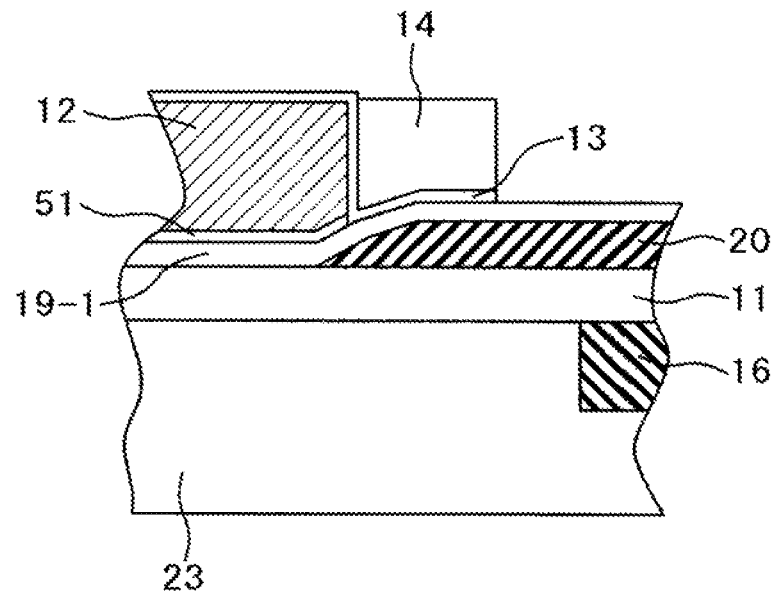
FIG. 6I is a diagram illustrating the process of creating the perpendicular magnetic recording head according to one embodiment.
Figure 6J:
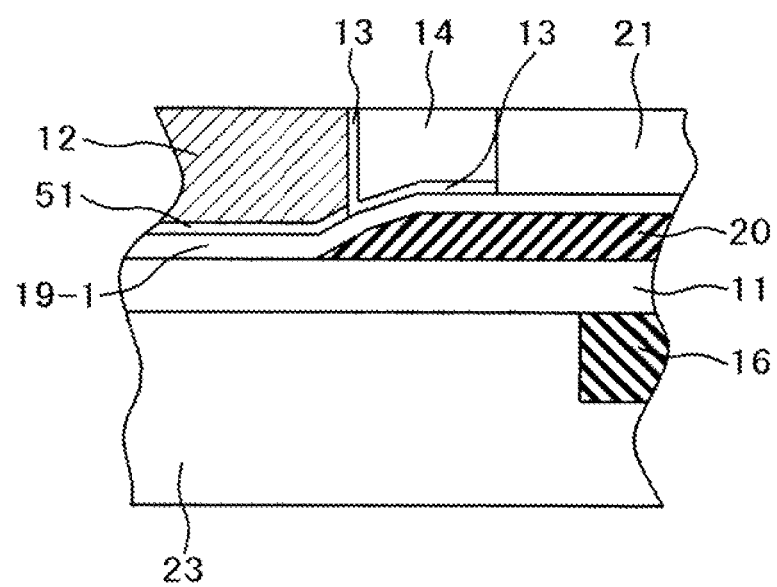
FIG. 6J is a diagram illustrating the process of creating the perpendicular magnetic recording head according to one embodiment.
Figure 6K:
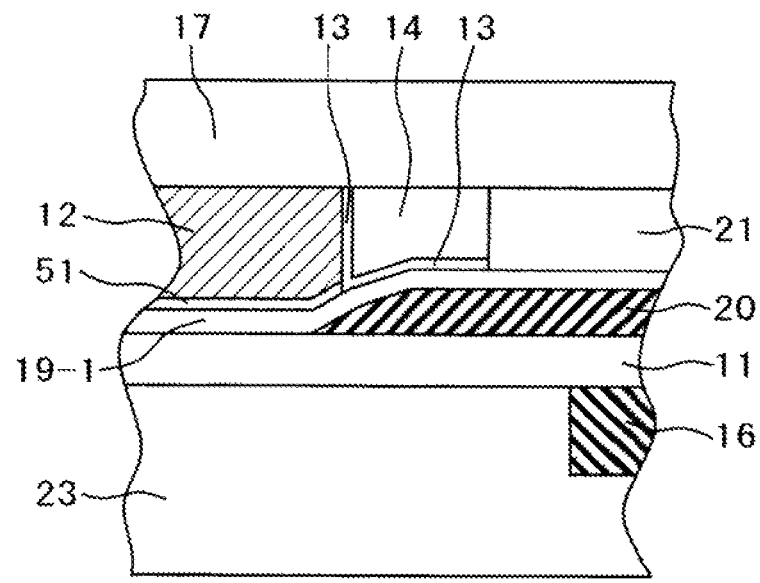
FIG. 6K is a diagram illustrating the process of creating the perpendicular magnetic recording head according to one embodiment.
Figure 6L:
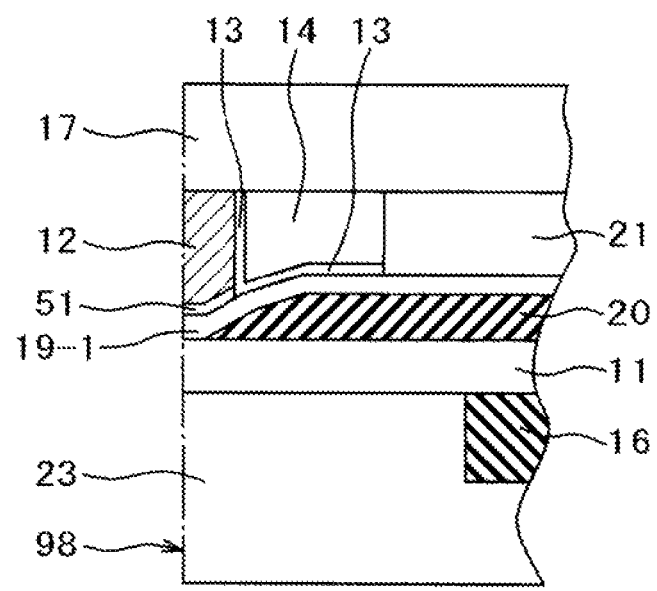
FIG. 6L is a diagram illustrating the process of creating the perpendicular magnetic recording head according to one embodiment.

FIG. 6A shows the state where non-magnetic film 23 is formed after forming the lower coil, and then main magnetic pole 11 is formed after forming magnetic film 16 constituting second magnetic film. FIG. 6B shows the state where non-magnetic film 19-1 and non-magnetic film 20 with an oblique surface at the end are formed above this. In FIG. 6C sheet film 51 is covered onto this to form a coating of first soft magnetic film. This is sheet film 51 can also be used as non-magnetic film 19-1. In FIG. 6D resist pattern 52 for selectively forming first soft magnetic film is formed above this. The edge of the resist pattern is set in a position raised slightly above the end of non-magnetic film 20. In FIG. 6E soft magnetic film layer 12 is formed using the resist pattern 52 as a mask. In FIG. 6F after removing resist pattern 52, a covering of non-magnetic film 13 is formed. In the process of forming the element non-magnetic film 13 acts as a conductive non-magnetic film, so it can act as a sheet film when forming second soft magnetic film. In FIG. 6G resist pattern 55 is formed above this to selectively form the second soft magnetic film. In FIG. 6H second soft magnetic film 14 is formed by a passing electricity through non-magnetic film 13. In FIG. 6I resist pattern 55 is removed and the unnecessary portions of non-magnetic film 13 used as the sheet film are removed. Thereafter, as shown in FIG. 6J the provision of non-magnetic film 21 acts as an insulation for the upper coil, and moreover this upper surface is smoothed using Chemical Mechanical Polishing (CMP), provided for the remainder of the process. FIG. 6K shows auxiliary magnetic pole 17 comprising the first magnetic film formed on this smooth surface. However, in FIG. 6K auxiliary magnetic pole 17 is shown schematically, and its upper part appears flat. Subsequently after passing through the same processes as for a normal magnetic head manufacturing process, the process comes to an end. FIG. 6L shows a cross-section presuming an ABS98 cut out using a mechanical grinding process after all the wafer processes are complete, according to one embodiment. First soft magnetic film 12 exposed on floating surface 98 and second soft magnetic film 14 positioned to its rear with non-magnetic film 13 interposed can be clearly seen. In particular in the above process the way in which first soft film 12 rises up over the end of non-magnetic film 20 can be seen. Moreover, there are points where sheet film 51 remains on the floating surface when the first soft magnetic film 12 is coated as a film and non-magnetic film 13 remains on the bottom part of second soft magnetic film 14 which is the particular structure of this process. Having a sheet film 51 made of magnetic conductive film with high saturation flux density allows it to be given the same function as first soft magnetic film 12. Furthermore, where a non-magnetic conductive film is used in sheet film 51, it will not be necessary to state that it can be given the same function as non-magnetic layer 19-1. Furthermore, non-magnetic film 13 can be deliberately not formed, as it is possible to interpose non-magnetic film 13 between first soft magnetic film 12 and second soft magnetic film 14 by oxidizing the rear wall of first soft magnetic film 12 after it has been formed. In this case the thickness of non-magnetic film 13 is approximately 1 nm. This can be said to be the minimum thickness for a non-magnetic film.

It also goes without saying that the interposition of non-magnetic film 13 at the bottom of second soft magnetic film has the same function as non-magnetic film 19-1, and the presence or absence of these films can be said to be greatly affected by the method with they are produced. Moreover, the fact that non-magnetic film 13 remains quite thickly means that the magnetic distance between main magnetic pole 11 and second soft magnetic film 14 is large, and the greater it is the magnetic charge remaining when recording is carried out using main magnetic pole 11 will clearly be unlikely to act on second soft magnetic film 14. Pole erasure has sometimes been caused as a result of this. The degree will vary with the characteristics of the remaining magnetic charge of the material used in main magnetic pole 11, but pole erasure can be prevented within a range with an upper limit of around 100 nm, the approximate width of the main magnetic pole. For this reason, the film thickness of non-magnetic film 13 positioned between first soft magnetic film 12 and second soft magnetic film 14 needs to be set in the range of about 1 nm to about 100 nm. The film thicknesses used in the constituent elements in the process of producing various elements differ widely, but the minimum conditions for film thickness and the like necessary to satisfy the function of a recording head are widely understood by persons skilled in the art. For this reason in this one particular embodiment the minimum elements for enabling a still higher magnetic field gradient have been deliberately disclosed.

Figure 2A:
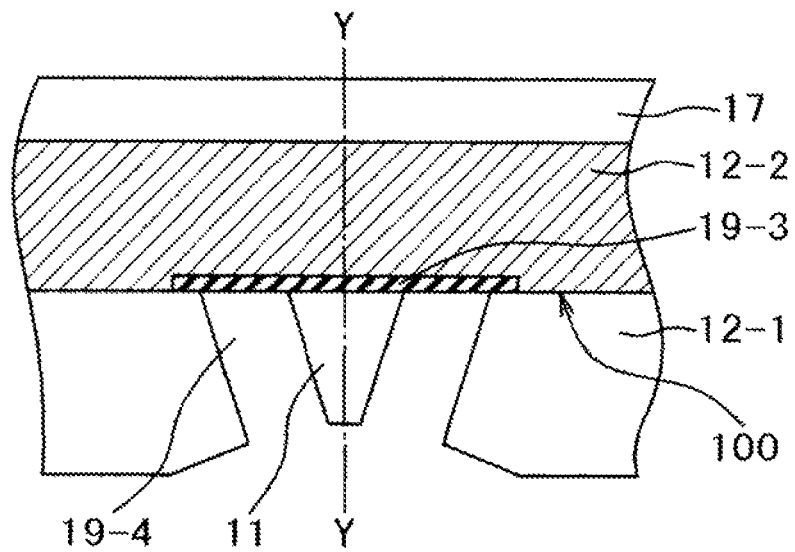
FIG. 2A is an enlarged diagram of parts of the perpendicular magnetic recording head according to one embodiment, as seen from the ABS.
Figure 2B:
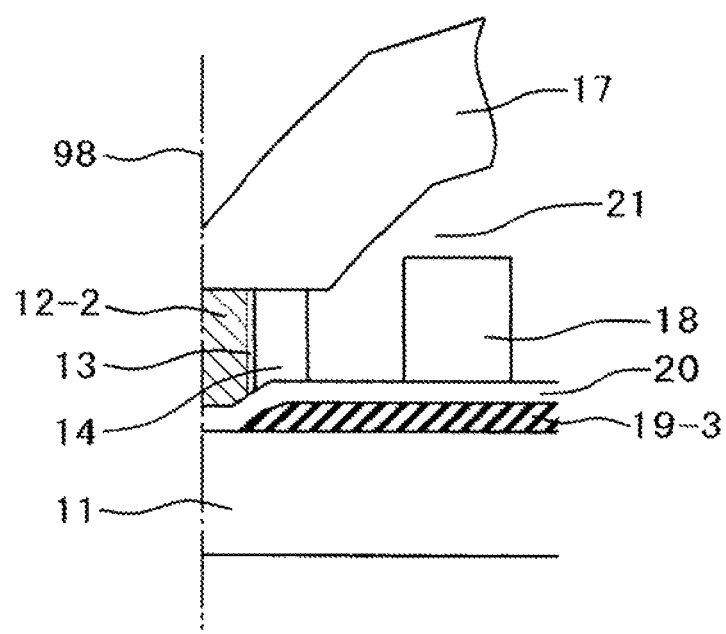
FIG. 2B is a cross-sectional view through the line Y-Y in FIG. 1A.

In one particular embodiment, first soft magnetic film 12 which improves the magnetic field gradient is formed as an integral structure on both sides and the trailing edge of main magnetic pole 11. Additionally it is also possible to form first soft magnetic film as a separate structure. FIG. 2A and FIG. 2B are diagrams illustrating the main parts of a recording head in a perpendicular magnetic recording head. In one particular embodiment 2, main magnetic pole 11 is formed, and then non-magnetic film 19-4 is formed, and a side shield (soft magnetic film) 12-1 is formed on both sides of main magnetic pole 11, with common surface 100 above main magnetic pole 11 subjected to CMP as the basic structure. After forming common surface 100, non-magnetic film 19-3 is positioned to surround at least main magnetic pole 11, forming a gap on the trailing side. Trailing shield (soft magnetic film) 12-2, non-magnetic film 13, and second soft magnetic film 14 are positioned above this. After processing by CMP the process is identical to that for a preferred embodiment. In one particular embodiment, trailing shield 12-2 is provided with relatively high saturation flux density and exposed on floating surface 98, with second soft magnetic film 14 positioned via non-magnetic film 13, the structure having the rear of trailing shield 12-2 raised up on the end of non-magnetic film 20.

Side shield 12-1 positioned on both sides of main magnetic pole 11 is formed in a process separate to that of trailing shield 12-2, with the advantage that materials, length and depth can be freely set. For example, with a side shield 12-1 made of relatively low saturation flux density film (IT in this Exemplary embodiment), an improvement in the recording magnetic field of around 1 KOe was obtained with the depthwise length around half that of trailing shield 12-2. This example also allowed a high magnetic field gradient to be obtained with an improvement of around 10% on one particular embodiment due to the presence of a high saturation flux density film 12-2 on the floating surface side.

FIG. 7 shows parts of a recording head in a perpendicular magnetic recording head of one embodiment. FIG. 7 shows main magnetic pole 11 which is a main part of the recording head and first soft magnetic film 12 which comprises the adjacent magnetic shield, non-magnetic film 13, and second soft magnetic film 14 positioned to the rear of this. Non-magnetic film 51 is a sheet film coating first soft magnetic film 12. Below this is non-magnetic film 19-1 comprising the recording gap. In this Exemplary embodiment, the characteristic point is that the film thickness of non-magnetic film 13 is different where it is in contact with the rear surface of first soft magnetic film 12 and where it is in contact with non-magnetic film 19-1. This difference can be formed by applying non-magnetic film 13 obliquely (with first soft magnetic film 12 being temporarily masked) or by radiating Ar ions from an oblique direction after application to form selectively thinner regions of film. In particular having a thicker film at the bottom part of second soft magnetic film 14 means that it can be created without having to provide non-magnetic film 20 as in a preferred embodiment. As is clear from the calculation results described in one particular embodiment, there is a margin in the depthwise length for first soft magnetic film 12, and in particular in this one particular embodiment the rear of first soft magnetic film 12 has a structure which matches the position where the thickness of non-magnetic film 13 becomes automatically thicker. For this reason, in this one particular embodiment, it is possible to ensure that the structure is such that magnetic flux is concentrated in first soft magnetic film 12 with partial variation in film thickness in non-magnetic film 13 without the need to provide in end section to non-magnetic film 20 according to one embodiment.

The perpendicular magnetic recording head of the invention satisfies the need for high recording magnetic field and high magnetic field gradient, and can be used in a magnetic disk devices capable of high recording densities in excess of 500 Gb/in$^2$.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic recording head, comprising:
   a main magnetic pole having a trailing side and two lateral sides;
   a magnetic shield above the trailing side of the main magnetic pole, the magnetic shield comprising:
     a first soft magnetic film having a floating surface side;
     a second soft magnetic film with a relatively lower saturation flux density relative to a flux density of the first soft magnetic film, the second soft magnetic film being positioned on an opposite side of the first soft magnetic film as the floating surface side of the first soft magnetic film; and
     a first non-magnetic film;
   a non-magnetic film interposed between the magnetic shield and the main magnetic pole;
   a first magnetic film magnetically coupled to the magnetic shield and the main magnetic pole on a side opposite a floating surface side thereof; and a coil surrounding a magnetic circuit, the magnetic circuit comprising the main magnetic pole and the first magnetic film.

2. The perpendicular magnetic recording head of claim 1, further comprising a second non-magnetic film between the main magnetic pole and the non-magnetic film on the trailing side of the main magnetic pole, the second non-magnetic film having an end positioned closest to a floating surface side of the non-magnetic film recessed from the floating surface side thereof.

3. The perpendicular magnetic recording head of claim 2, wherein a portion of the second soft magnetic is positioned above the second non-magnetic film.

4. The perpendicular magnetic recording head of claim 1, wherein a depthwise length of the first soft magnetic film, in a direction perpendicular to a floating surface side of trailing shield, is shorter than a depthwise length of the second soft magnetic film.

5. The perpendicular magnetic recording head of claim 1, wherein a depthwise length of the first non-magnetic film is in a range of about 1 nm to about 100 nm.

6. The perpendicular magnetic recording head of claim 1, wherein the first non-magnetic film is an oxide film of the first soft magnetic film.

7. The perpendicular magnetic recording head of claim 1, wherein the first non-magnetic film is a non-magnetic alloy.

8. The perpendicular magnetic recording head of claim 7, wherein the non-magnetic metal is Cr or Ti.

9. The perpendicular magnetic recording head of claim 1, wherein a recording gap is formed between the main magnetic pole and the first soft magnetic film by the non-magnetic film.

10. The perpendicular magnetic recording head of claim 1, wherein the first soft magnetic film is a NiFeCo alloy, and the second soft magnetic layer is a NiFe alloy.

11. The perpendicular magnetic recording head of claim 1, further comprising a second magnetic film, wherein the second magnetic film magnetically couples the main magnetic pole to the first magnetic film.

12. A system, comprising:
a magnetic recording medium;
at least one magnetic head as described in claim 1 for reading from and/or writing to the magnetic recording medium;
a magnetic head slider for supporting the magnetic head; and
a control unit coupled to the magnetic head for controlling operation of the magnetic head.

13. A perpendicular magnetic recording head, comprising:
a main magnetic pole with a trailing side and two lateral sides;
a side shield near the lateral sides of the main magnetic pole;
a first non-magnetic film interposed between the side shield and the main magnetic pole;
a trailing shield exposed on a floating surface side thereof near the trailing side of the main magnetic pole, the trailing shield being a first soft magnetic film with a relatively high saturation flux density;
a second non-magnetic film interposed between the trailing shield and the main magnetic pole;
a second soft magnetic film having a relatively low saturation flux density near a rear side of the trailing shield;
a third non-magnetic film interposed between the trailing shield and the second soft magnetic film;
a first magnetic film magnetically coupled to the trailing shield and the main magnetic pole on a side opposite a floating surface side thereof; and
a coil surrounding a magnetic circuit, the magnetic circuit comprising the main magnetic pole and the first magnetic film,
wherein a depthwise length of the first soft magnetic film, in a direction perpendicular to a floating surface side of trailing shield, is shorter than a depthwise length of the second soft magnetic film.

14. A system, comprising:
a magnetic recording medium;
at least one magnetic head as described in claim 13 for reading from and/or writing to the magnetic recording medium;
a magnetic head slider for supporting the magnetic head; and
a control unit coupled to the magnetic head for controlling operation of the magnetic head.

15. A perpendicular magnetic recording head, comprising:
a main magnetic pole with a trailing side and two lateral sides;
a side shield positioned near along lateral sides of the main magnetic pole; and
a trailing shield positioned above the trailing side of the main magnetic pole and extending laterally from above the main magnetic pole to above each of the side shields,
wherein a depthwise length of the side shield, in a direction perpendicular to a floating surface side of trailing shield, is about half a depthwise length of the trailing shield.

16. A system, comprising:
a magnetic recording medium;
at least one magnetic head as described in claim 15 for reading from and/or writing to the magnetic recording medium;
a magnetic head slider for supporting the magnetic head; and
a control unit coupled to the magnetic head for controlling operation of the magnetic head.

17. A perpendicular magnetic recording head, comprising:
a main magnetic pole having a trailing side and two lateral sides;
a magnetic shield near the trailing side and both lateral sides of the main magnetic pole;
a non-magnetic film interposed between the magnetic shield and the main magnetic pole;
a first magnetic film magnetically coupled to the magnetic shield and the main magnetic pole on a side opposite a floating surface side thereof; and
a coil surrounding the a magnetic circuit, the magnetic circuit comprising the main magnetic pole and the first magnetic film,
wherein the magnetic shield comprises:
a first soft magnetic film having a relatively high saturation flux density exposed on a floating surface side thereof;
a second soft magnetic film having a relatively low saturation flux density; and
a first non-magnetic film formed on a rear wall of the first soft magnetic film and above the non-magnetic film, the first non-magnetic film being positioned between the rear wall of the first soft magnetic film and a side of the second soft magnetic film facing the rear wall of the first soft magnetic film.

18. A system, comprising:
a magnetic recording medium;

at least one magnetic head as described in claim 17 for reading from and/or writing to the magnetic recording medium;
a magnetic head slider for supporting the magnetic head; and
a control unit coupled to the magnetic head for controlling operation of the magnetic head.

\* \* \* \* \*

UNITED STATES PATENT AND TRADEMARK OFFICE
CERTIFICATE OF CORRECTION

PATENT NO. : 8,542,462 B2
APPLICATION NO. : 12/827999
DATED : September 24, 2013
INVENTOR(S) : Maruyama et al.

It is certified that error appears in the above-identified patent and that said Letters Patent is hereby corrected as shown below:

In the specification:

col. 1, line 10 replace "tiled" with --filed--;

col. 9, line 19 replace "soil" with --soft--;

col. 13, line 60 replace "(IT" with --(1 T--.

Signed and Sealed this
Twelfth Day of November, 2013

Teresa Stanek Rea
*Deputy Director of the United States Patent and Trademark Office*